Feb. 3, 1953 D. R. MUSS ET AL 2,627,545

SEMICONDUCTOR DEVICE

Filed Aug. 19, 1950

WITNESSES:

H. F. Susser

Wm. T. Wofford

INVENTORS
Lloyd P. Hunter
and Daniel R. Muss.
BY F. E. Browder
ATTORNEY

Patented Feb. 3, 1953 2,627,545

UNITED STATES PATENT OFFICE 2,627,545

SEMICONDUCTOR DEVICE

Daniel R. Muss and Lloyd P. Hunter, Pittsburgh, Pa., assignors to Westinghouse Electric Corporation, East Pittsburgh, Pa., a corporation of Pennsylvania Application August 19, 1950, Serial No. 180,374

21 Claims. (Cl. 175—366)

Figure 1:
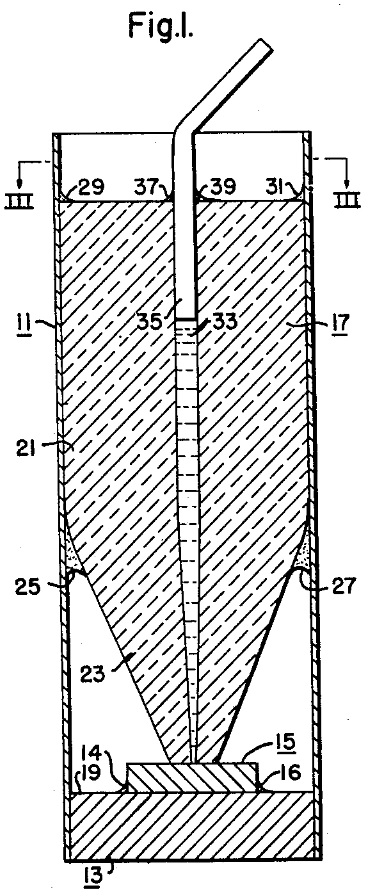

My invention is related generally to semi-conductor devices and more particularly to improved rectifying contacts for said devices.

Semi-conductor diodes conventionally comprise a block of semi-conductive material having two electrodes associated therewith. One of these electrodes is generally a plate, or block of low resistance conductive material having a relatively large contact area, while the other is essentially a point contact. The point contact, or rectifying electrode, is usually made of very fine wire having a sharp pointed end. The operating characteristics of such a diode are sensitive to the size, pressure and location of the point contact. Point contacts made of delicate wire have a tendency to shift location and vary pressure as a result of shock and vibration met in normal handling and operation, unless extreme care is exercised in setting them so that their spring pressure is vertical. The recently developed semi-conductor amplifier which has been termed a transistor has two such point contacts. The spacing of these contacts is small and is critical for the specific type characteristic desired. For example, if it is desired to operate a transistor using high resistivity semi-conductive material at the upper end of its frequency range, contact spacing must be very small, of the order of .002 inch. In addition to the difficulty encountered in the initial positioning of these contacts it has been found that the microphonic condition present in some amplifiers, is due to variations in contact pressure.

It is accordingly an object of our invention to provide an improved point, or rectifying, contact for a semi-conductor device.

It is another object of our invention to provide a rectifying contact for a semi-conductor device which shall be rigid with respect to the semi-conductive material.

It is another object of our invention to provide a rectifying contact for a semi-conductor device which shall be unaffected by shock and vibration met in normal handling and operation.

Another object of our invention is to provide a rectifying contact for a semi-conductor device, the contact area of which is readily predetermined.

Another object of our invention is to provide rectifying contacts for use with a semi-conductor amplifier which shall be accurately prespaced.

It is a further object of our invention to provide rectifying contacts for use with a semiconductor amplifier which shall withstand shock and vibration encountered in normal handling and operation without changing contact spacing, pressure or location.

In accordance with our invention, the rectifying contact is formed from a glass tube having predetermined inside dimensions. A portion of the glass tube is tapered by drawing, so that the inside dimensions will be decreased. The drawing process can be controlled so that the ratio of inside to outside tube dimensions is held substantially constant. The tube may then be cut on the tapered portion at a point of desired inside dimensions, as determined by the outside dimensions at that point. After grinding the end to form a smooth surface, the tube is mounted rigidly with respect to a semi-conductive body with the ground surface in abutting relation to the body. Suitable liquid conductive material is then placed in the tube and forced by a conductive rod to contact the semi-conductive body with the desired pressure. The rod is then fixed to maintain this pressure. A plurality of point contacts having desired spacing and contact area can be formed in a similar manner from a glass rod having a plurality of longitudinal holes therein. It is conceivable that a suitable non-conductive member other than a glass tube, having passages therein, could also be used.

Figure 2:
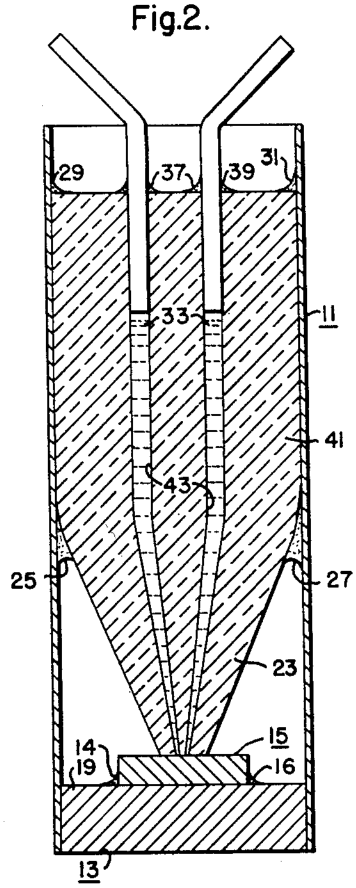
Figure 3:
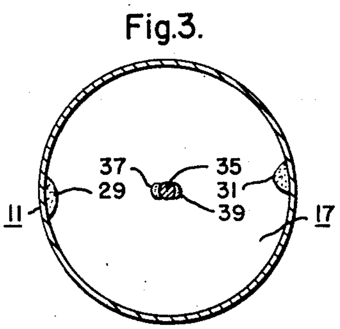

The novel features that are considered characteristic of our invention are set forth with particularity in the appended claims. The invention itself, however, both as to its organization and method of operation as well as additional objects and advantages thereof will best be understood from the following description when read in connection with the accompanying drawing in which:

Figure 1 is a schematic elevation partially in section showing a rectifying contact made in accordance with a preferred embodiment of our invention, Fig. 2 is a schematic elevation partially in section showing rectifying contacts for a semi-conductor amplifier made in accordance with a preferred embodiment of our invention, and Fig. 3 is a section taken at III—III of Fig. 1.

Fig. 1 shows a semi-conductor diode comprising a cylindrical shell 11, a base electrode 13, a block of semi-conductive material 15 and a rectifying contact assembly 17. The cylindrical shell 11 may be made of any suitable material such as metal, plastic, etc. The base electrode 15 is a relatively large block of a good conducting material, for example, brass or copper. The base electrode 13 is formed to close one end of the cylindrical shell 11, and is rigidly attached thereto. A small block of semi-conductive material 15 such as silicon or germanium is secured by conventional means as by soldering 14, 16 to the center of the inside face 19 of the base electrode 13. The rectifying contact assembly 17 is fabricated utilizing a glass tube 21 having predetermined outside and inside dimensions. While we prefer to utilize a tube having a circular transverse cross-section, it is within the scope of our invention to utilize other shapes such as square, triangular, rectangular, etc. A portion of the glass tube is tapered by drawing. The inside dimensions of the tube will be decreased by the drawing process and the tube may be cut at a point of desired inside dimensions as determined by the outside dimensions at the point of cutting. After the end is ground to present a smooth surface, the tube is placed inside the shell 11 with the smooth surface in abutting relation to the upper surface of the semi-conductive material 15. The tube 21 is secured rigidly in this position by a suitable means such as cementing at appropriate points 25, 27, 29, 31. The tube 21 is then partially filled with liquid conductive material 33. We prefer to use mercury for this purpose, however, the use of other suitable materials such as amalgams of mercury, gallium, etc. are within the scope of our invention. The liquid conductive material 33 is forced into contact with the semi-conductive surface 15 by means of a conductive rod 35 inserted in the untapered end of the glass tube 21. When the desired contact pressure has been attained the rod 35 is fixed relative to the tube to maintain this pressure. The rod may be fixed by any suitable means, for example, by sealing it to the top of the tube with cement or glue 37, 39.

Fig. 2 shows a semi-conductive device having two point contacts for a semi-conductor amplifier made in accordance with our invention. The structure of the device shown in Fig. 2 is very similar to that of Fig. 1 and detailed description will therefore be dispensed with. Like parts of Figs. 1 and 2 bear the same reference characters. The rectifying contacts of Fig 2 are formed from a glass rod 41 having a pair of longitudinal holes 43 of predetermined dimensions and spacing therein. The rod 41 is tapered by drawing and cut in the manner described for Fig. 1. The relationship of the hole dimensions and spacing in the rod before drawing is predetermined by the relationship desired after drawing.

Rectifying contacts made in accordance with the teachings of our invention are rigid and thus not subject to variations in pressure, size or spacing. Further, the contact areas and spacing may be predetermined, thus avoiding the exacting and difficult task of spacing after assembly.

It is feasible to make any desired number of contacts utilizing a single glass rod having a plurality of longitudinal holes of appropriate dimensions and spacing therein. The glass tubes used may be of the standard capillary type. Glass rods having the desired number of holes with desired dimensions and spacing may be made by forming glass over a number of stretched wires acting as mandrels. The wires may then be dissolved by use of suitable chemicals.

While we have shown and described certain specific embodiments of our invention, we are aware that some modifications are possible and we desire therefore to be restricted only insofar as is necessitated by the prior art and the spirit of the appended claims.

We claim as our invention:

1. A semi-conductive device comprising a body of semi-conductive material and an electrode comprising a glass tube having a tapered end portion, the inside dimension of said tube at the tip of said tapered end being substantially smaller than the inside dimension of said tube at the beginning of said tapered portion, conductive material in said tube forming a conductive path from the tip of said tube to its opposite end, the tip of said tube being in contact with said body.

2. A semi-conductive device comprising a body of semi-conductive material and an electrode comprising a cylindrical glass tube having a tapered end portion, the inside diameter of said tube at the tip of said tapered end being substantially smaller than the inside diameter of said tube at the beginning of said tapered portion, conductive material in said tube forming a conductive path from the tip of said tube to its opposite end, the tip of said tube being in contact with said body.

3. A semi-conductive device comprising a body of semi-conductive material and an electrode comprising a cylindrical glass tube having a tapered end portion, the inside diameter of said tube at the tip of said tapered end being substantially smaller than the inside diameter of said tube at the beginning of said tapered portion, liquid conductive material in said tube, the tip of said tube being in contact with said body, and pressure means acting on said conductive material from the end of said tube opposite the tapered end.

4. The invention in accordance with claim 3 wherein said liquid conductive material is mercury.

5. The invention in accordance with claim 3 wherein said liquid conductive material is mercury and said pressure means comprises a rod of conductive material.

6. A semi-conductive device comprising a body of semi-conductive material and an electrode comprising a glass tube having a cylindrical body portion of first predetermined outside and inside diameters, and a tapered end portion which has been formed by drawing the glass and cutting it at a point of second predetermined outside and inside diameters of substantially smaller magnitude than said first diameters, conductive material in said tube forming a conductive path from the tip of said tube to the opposite end, the tip of said tube being in contact with said body.

7. A semi-conductive device comprising a body of semi-conductive material and an electrode comprising a glass tube having a portion of first predetermined inside diameter, and a tapered end portion which has been formed by drawing the glass and cutting it at a point of second predetermined inside diameter of substantially smaller magnitude than said first diameter, conductive material in said tube forming a conductive path from the tip of said tube to the opposite end, the tip of said tube being in contact with said body.

8. A semi-conductive device comprising a body of semi-conductive material and an electrode comprising a glass tube having a portion of first predetermined inside diameter, and a tapered end portion which has been formed by drawing the glass and cutting it at a point of second predetermined inside diameter of substantially smaller magnitude than said first diameter, liquid conductive material in said tube, the tip of said tube being in contact with said body, and pressure means acting on said conductive material from the end of said tube opposite the tapered end.

9. The invention in accordance with claim 8 wherein said liquid conductive material is mercury.

10. The invention in accordance with claim 8 wherein said liquid conductive material is mercury and said pressure means comprises a rod of conductive material.

11. A semi-conductive device comprising a body of semi-conductive material and an electrode comprising a capillary tube at one end of which has been tapered by drawing, and cut at a point of predetermined inside diameter, liquid conductive material in said tube, the tip of said tube being in contact with said body, and conductive pressure means acting on said conductive material from the end of said tube opposite the tapered end.

12. A semi-conductive device comprising a body of semi-conductive material and a pair of electrodes comprising a double capillary tube, the capillaries being spaced a first predetermined distance and having first predetermined transverse dimensions, one end of said tube having been tapered by drawing and cut at a point of second predetermined capillary spacing and transverse dimensions, the tapered end of said tube being in contact with said body, liquid conductive material in said capillaries and conductive pressure means acting on said conductive material from the end of said tube opposite said tapered end.

13. A semi-conductive device comprising a body of semi-conductive material having a plane surface, a glass rod having a plurality of longitudinal holes therein, said holes having first predetermined transverse dimensions and spacing, one end of said rod having been tapered by drawing and cut at a point of second predetermined hole spacing and transverse dimensions, the tapered end of said rod being in contact with said surface, liquid conductive material in said holes, and conductive pressure means acting on said liquid conductive material in each of said holes from the end of said rod opposite said tapered end.

14. The method of providing a rectifying contact for a semi-conductive body comprising taking a glass tube of a predetermined inside dimension, tapering a portion of said tube by drawing, cutting said tapered portion at a point of predetermined inside dimensions, preparing a smooth surface on the tapered end of said tube, mounting said tube rigidly with respect to said semi-conductive body with said surface in abutting relation to said body, partially filling said tube with liquid conductive material, placing a conductive rod in the end of said tube opposite said tapered end and in contact with said conductive liquid, applying a predetermined pressure on said liquid by means of said rod, and fixing said rod with respect to said tube to maintain said predetermined pressure.

15. The method of providing a rectifying contact for a semi-conductive body comprising taking a glass tube of a predetermined inside diameter, tapering a portion of said tube by drawing, cutting said tapered portion at a point of predetermined inside diameter, preparing a smooth surface on the tapered end of said tube, mounting said tube rigidly with respect to said semi-conductive body with said surface in abutting relation to said body, partially filling said tube with a conductive metal which is liquid at room temperature, placing a conductive rod in the end of said tube opposite said tapered end and in contact with said liquid metal, applying a predetermined pressure on said liquid by means of said rod, and fixing said rod with respect to said tube to maintain said predetermined pressure.

16. The method of providing a plurality of closely spaced rectifying contacts for a semi-conductive body comprising taking a glass rod having a plurality of small longitudinal holes therein, of predetermined dimensions and spacing, tapering a portion of said tube by drawing, cutting said tapered portion at a point of predetermined hole dimensions and spacing, preparing a smooth surface on the tapered end of said tube, mounting said tube rigidly with respect to said semi-conductive body with said surface in abutting relation to said body, partially filling said holes with a conductive metal which is liquid at room temperature, placing conductive rods in said holes and in contact with said liquid metal, applying predetermined pressures to said rods, and fixing said rods with respect to said tubes to maintain said pressures.

17. The method of providing a rectifying contact for semi-conductive body comprising taking a glass tube of predetermined inside diameter, tapering a portion of said tube by drawing, cutting said tapered portion at a point of predetermined inside and outside diameter as determined by the outside diameter at that point, preparing a smooth surface on the tapered end of said tube, mounting said tube rigidly with respect to said semi-conductive body with said surface in abutting relation to said body, partially filling said tube with a conductive metal which is liquid at room temperature, placing a conductive rod in the end of said tube opposite said tapered end and in contact with said liquid metal, applying a predetermined pressure on said liquid by means of said rod, and fixing said rod with respect to said tube to maintain said predetermined pressure.

18. A semi-conductive device comprising a body of semi-conductive material and an electrode comprising a non-conductive member having a passage therein, the transverse dimension of said passage at one end of said member being smaller than at the other end of said member, conductive material in said passage and forming a conductive contact with said semi-conductive material adjacent the small transverse dimension of said passage.

19. A semi-conductive device comprising a body of semi-conductive material and an electrode comprising a non-conductive member having a tapered passage therein, the transverse dimension of said passage at one end of said member being smaller than at the other end of said member, conductive material filling said passage and forming a conductive contact with said semi-conductive material adjacent the small transverse dimension of said passage.

20. A semi-conductive device comprising a body of semi-conductive material and an electrode comprising a non-conductive member having a tapered passage therein, the transverse dimension of said passage at the end of the taper being smaller than the transverse dimension of the passage at the beginning of the taper, the end of said taper terminating at the end of said member, conductive material in said passage and forming a conductive contact with said semi-conductive material adjacent the small transverse dimension of said passage.

21. A semi-conductive device comprising a body of semi-conductive material, a non-conductive member having a plurality of longitudinal holes therein, said holes having first predetermined transverse dimensions and spacing, one end of said member having been tapered by drawing and cut at a point of second predetermined hole spacing and transverse dimensions, the tapered end of said member being in contact with said body, and conductive material in said holes forming conductive contact with said body.

DANIEL R. MUSS.
LLOYD P. HUNTER.

REFERENCES CITED

The following references are of record in the file of this patent:

UNITED STATES PATENTS

| Number | Name | Date |
|---|---|---|
| 845,316 | Pickard | Feb. 26, 1907 |
| 2,156,660 | Van Geel | May 2, 1939 |